United States Patent [19]

Czekalski

[11] Patent Number: 4,484,265

[45] Date of Patent: Nov. 20, 1984

[54] CORNER TURN MEMORY ADDRESS GENERATOR

[75] Inventor: Martin W. Czekalski, Crownsville, Md.

[73] Assignee: Westinghouse Electric Corp., Pittsburgh, Pa.

[21] Appl. No.: 319,028

[22] Filed: Nov. 6, 1981

[51] Int. Cl.³ .................. G06F 7/00; G01S 13/00
[52] U.S. Cl. .................. 364/200; 343/5 DP
[58] Field of Search ... 364/200 MS File, 900 MS File; 343/5 DP

[56] References Cited

U.S. PATENT DOCUMENTS

| | | | |
|---|---|---|---|
| 3,969,704 | 7/1976 | Liebel, Jr. | 364/900 |
| 4,028,666 | 6/1977 | Suzuki et al. | 364/200 |
| 4,037,211 | 7/1977 | Ikuta et al. | 364/200 |
| 4,080,599 | 3/1978 | Conti | 343/5 DP |
| 4,093,995 | 6/1978 | Smith et al. | 364/900 |
| 4,120,043 | 10/1978 | Su | 364/900 |
| 4,131,943 | 12/1978 | Shiradgawa | 364/200 |
| 4,166,289 | 8/1979 | Murtha et al. | 364/200 |
| 4,167,778 | 9/1979 | Sipple | 364/200 |
| 4,189,767 | 2/1980 | Ahuja | 364/200 |
| 4,393,444 | 7/1983 | Weinberg | 343/5 DP |

*Primary Examiner*—Joseph F. Ruggiero
*Assistant Examiner*—Gary V. Harkcom
*Attorney, Agent, or Firm*—J. B. Hinson

[57] ABSTRACT

An address generator for corner turn memories which are dimensioned in integral powers of two is disclosed. A binary adder is utilized to combine the current address with a binary number which specifies the amount to be added to the current address to generate the next address of the corner turn sequence. Limiting the dimensions of the memory to integral powers of two simplifies the circuitry necessary to generate the corner turn address sequence.

5 Claims, 3 Drawing Figures

CORNER TURN MEMORY ADDRESS GENERATOR

BACKGROUND OF THE INVENTION

The invention relates to digital systems and more specifically to address generators for corner turn memories with the memory matrix being specified in integral binary powers.

DESCRIPTION OF PRIOR ART

It has been conventional in the prior art to generate corner turn memory address sequences using a generalized algorithm. Using this technique, the dimensions of the basic memory array were unlimited. Typically, these generalized algorithms were implemented using hard wires logic circuits. The generalized nature of the algorithm resulted in the address generators being very complicated.

SUMMARY OF THE INVENTION

The preferred embodiment of the invention comprises circuitry for generating corner turn addresses sequence for a digital memory. The circuitry includes first storage means for storing a digital number having a single logic "one" bit with the remainder of the bits being logic "zero". An adder is coupled to receive as inputs the current address and the number stored in the first storage means. The adder and the shift register receive control signals causing the number stored in the shift register to be shifted and added to the current address to produce at the output of the adder the next address in the corner turn address sequence.

DETAILED DESCRIPTION

Figure 1:
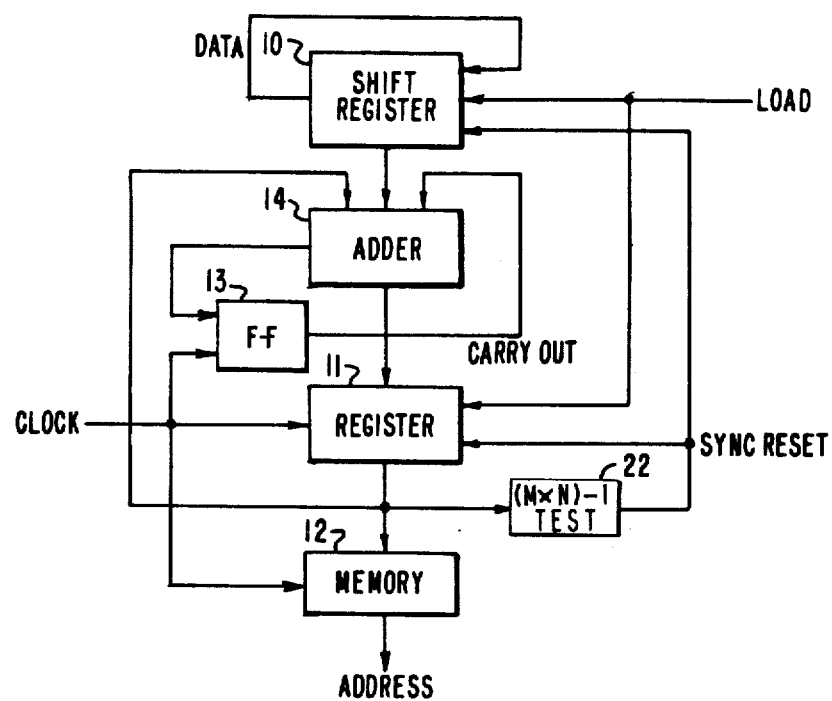
FIG. 1 is a block diagram of a circuit for generating a corner turn memory address sequence.

The preferred embodiment of the invention comprises a system for generating corner turn address sequences. Corner turn memory address sequences are widely used for many data processing functions typical of these being the processing of video information from Doppler radar systems. The basic memory used in corner turn operation can be thought of as a rectangular array having the desired number of memory storage locations. As is well known in the data processing art, the primary consideration for such an array is that the number of individual storage locations be sufficient to meet the requirements of the data processing function to be performed. Additionally, for convenient operation, the basic memory utilized in corner turn operations should be of the random access type so as to assure that the access time to any particular memory storage location is not dependent on the memory address sequences. To help further illustrate the fundamental concepts involved in the corner turn address sequences which can be generated utilizing the address generator which is the subject of the invention typical corner turn address sequences will be described in detail.

For purposes of illustrating the invention, a two by four memory array and the resulting address sequence is illustrated below:

```
       0 1
       2 3
       4 5
       6 7
    Memory Array
```

| | | | |
|---|---|---|---|
| Data Sample No. | 0 1 2 3 4 5 6 7 | | |
| Data Read No. | 0 2 4 6 1 3 5 7 | Cycle #1 | |
| Mem. Address | 0 1 2 3 4 5 6 7 | | |
| Data Sample No. | 0 1 2 3 4 5 6 7 | | |
| Data Read No. | 0 2 4 6 1 3 5 7 | Cycle #2 | 1 Period |
| Mem. Address | 0 2 4 6 1 3 5 7 | | |
| Data Sample No. | 0 1 2 3 4 5 6 7 | | |
| Data Read No. | 0 2 4 6 1 3 5 7 | Cycle #3 | |
| Mem. Address | 0 4 1 5 2 6 3 7 | | |
| Data Sample No. | 0 1 2 3 4 5 6 7 | | |
| Data Read No. | 0 2 4 6 1 3 5 7 | Cycle #4 | (Repeat of |
| Mem. Address | 0 1 2 3 4 5 6 7 | | Cycle #1) |

The array illustrated above is arranged in two columns and four rows. As previously disclosed, in the corner turn mode data is stored in rows and read in columns. Thus, the corner turn operation is actually made on a "data" basis rather than on a memory basis. Additionally, each memory cycle is preferably a read/store cycle. The memory array illustrated above is typical in that it incorporates all the features of corner turn memory sequences, i.e., the concepts of the corner turn address sequences are independent of the size of the memory.

For convenience of illustration, the memory address sequence generator for the corner turn operation are periodic with the sequence illustrated above is subdivided into three cycles. During each cycle, eight data samples (labeled 0 through 7) are taken and stored in the memory and the data stored in the memory is read for processing. The address identifying the memory locations at which the data is stored is determined by the last cycle with special provisions being made for an initialization cycle when no data has been previously stored. That is, during the initialization cycle the memory addresses always range sequentially from 0 to 7.

The sequence illustrated above assume that the system has been initialized resulting in the periodic sequence illustrated being continuously repeated. Since during all cycles, the data samples are sequentially taken and the stored data is read in a corner turn sequence, the "data sample No" and the "data read No" in all three cycles are identical. That is, the corner turn operation is performed on a "data sample" basis and not a "memory address" basis. Specifically, the "data sample Nos" range sequentially from zero to seven with the read sequence being 0, 2, 4, 6, 1, 3, 5, 7. Memory address numbers necessary to assure that the data samples are read in this sequence are generated.

Since each memory cycle is a read/store operation and the data samples are always sequential the actual memory address sequence changes for each cycle with the first cycle being 0 through 7, the second cycle 0, 2, 4, 6, 1, 3, 5, 7, the third cycle 0, 4, 1, 5, 2, 6, 3, 7. Following the third cycle, the first cycle is repeated.

To further illustrate the principle of the address sequence generate a four by four array and the resulting address sequencer are illustrated below:

| 0 | 1 | 2 | 3 |
|---|---|---|---|
| 4 | 5 | 6 | 7 |
| 8 | 9 | 14 | 11 |
| 12 | 13 | 10 | 15 |

Memory Array

| | | |
|---|---|---|
| Data Sample No. | 0 1 2 3 4 5 6 7 8 9 10 11 12 13 14 15 | |
| Data Sample Read | 0 4 8 12 1 5 9 13 2 6 10 14 3 7 11 15 | Cycle #1 |
| Memory Add | 0 1 2 3 4 5 6 7 8 9 10 11 12 13 14 15 | |
| Data Sample No. | 0 1 2 3 4 5 6 7 8 9 10 11 12 13 14 15 | |
| Data Sample Read | 0 4 8 12 1 5 9 13 2 6 10 14 3 7 11 15 | Cycle #2 |
| Memory Add | 0 4 8 12 1 5 9 13 2 6 10 14 3 7 11 15 | |
| Data Sample No. | 0 1 2 3 4 5 6 7 8 9 10 11 12 13 14 15 | Cycle #3 |
| Data Sample Read | 0 4 8 12 1 5 9 13 2 6 10 14 3 7 11 15 | (Repeat of |
| Mem Add | 0 1 2 3 4 5 6 7 8 9 10 11 12 13 14 15 | Cycle #1) |

1 Period

Figure 2:
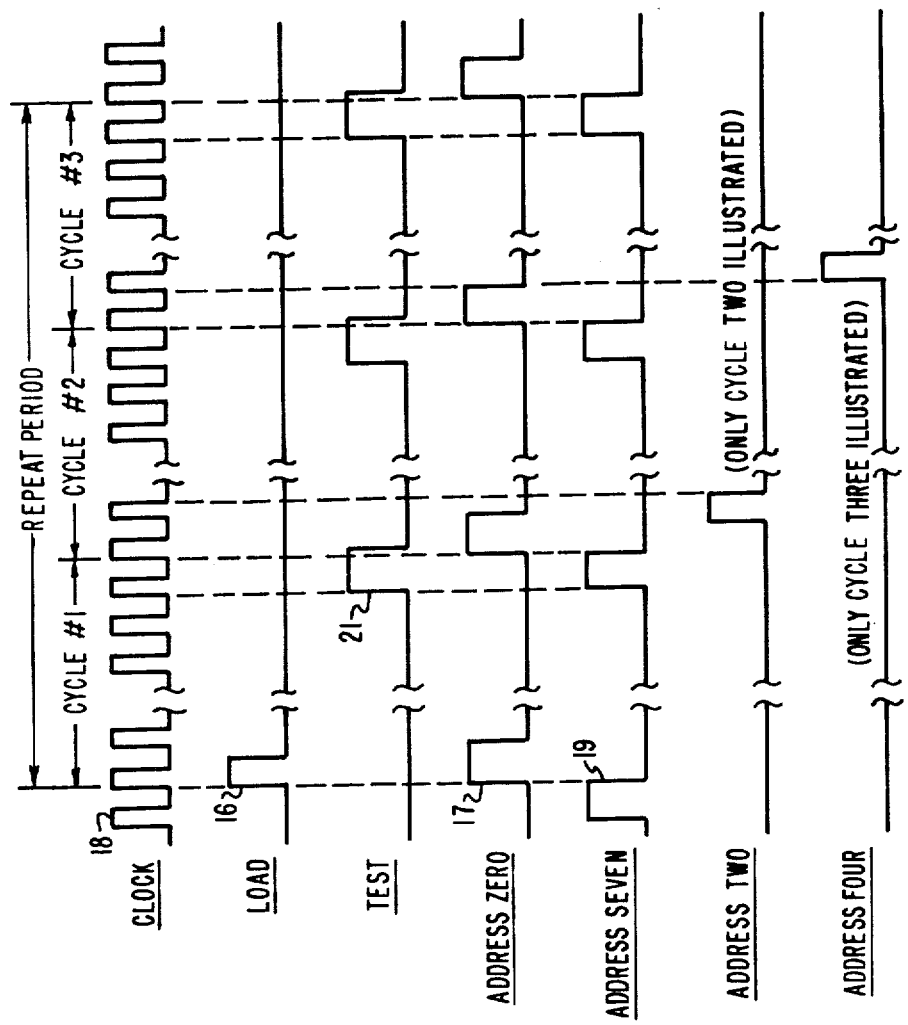
FIG. 2 is a waveform diagram illustrating the operation of the circuit illustrated in FIG. 1.

As in the first case, this sequence is cyclic and only contains two cycles in the repeat period. In general, the number of cycles within a repeat period can be calculated from the following formula:

$$\text{Number of cycles within a period} = \frac{m + n}{gcd(m,n)}$$

where $m = LOG_2 M$ ($M = \#$ of columns)
$n = LOG_2 N$ ($N = \#$ of rows)
$gcd(m,n)$ = greatest common divisor of $m$ and $n$ FIG. 1 is a logic block diagram of a system for generating the address sequences as discussed above for the two by four array. FIG. 2 is a timing diagram illustrating the operation of this circuit for circuit illustrated in FIG. 1.

The operation of the system illustrated in FIG. 1 will be described utilizing the corner turn address sequence shown above of a typical address sequence. Based on this description, it is believed that the operation and modifications of this circuit for generating other address sequences will also be obvious.

The embodiment of the invention illustrated in FIG. 1 includes a shift register 10. This register is included to provide a digital number having a single logic "one" bit with all other bits being logic "zero". This number is repeatedly added to the current address to generate the next address. The current address is also stored in a memory 12 which may be a series of flip-flops, for example and in a register 11. This prevents premature changing of the current address. The output of the register 11 and the number stored in shift register 10 are combined in an adder 14 to generate the next address. The carry output of the adder 14 is also stored in a flip-flop 15 to provide a signal to the carry input port of the least significant bit of the adder 14.

The generation of a corner turn memory address sequence is initiated by a load signal 16 (FIG. 2) which is provided by the system utilizing the corner turn memory. The system also provides a pulsed clock signal 18 which is used in the memory address sequence generation as will be discussed below.

On the leading edge of the load pulse 16, the contents of the storage memory 12 is set to zero and a logic one bit is set into the least significant bit position of the shift register 10 with the remaining bits of this register being set to logic zero. This number stored in the shift register 10 will remain stable during the first period of the corner turn address sequence. On the leading edge of each pulse of the clock signal 18, the number present at the output of the adder 14 will be clocked into the register 11 and the storage memory 12. This will result in the generation of the cycle #1 address sequence previously described. The timing for address "zero" and "seven" are respectively illustrated at reference numerals 17 and 19 (FIG. 2). That is, a new address of the corner turn sequence is generated for each pulse of the clock signal 18. More specifically, during the first interval of the clock signal following the trailing edge of the load pulse 16, the number stored in the memory 12 will be zero because this memory was reset by the load pulse and the leading edges of the test signal 21. The number stored in shift register 10 will be equal to one because it is in the least significant bit of this register. The output of the shifter register 12 is coupled as the first input to the adder 14 and the contents of the shift register 10 are coupled as a second input to this adder. Thus, during the first interval of the clock signal 18 following the trailing edge of the load pulse 16, the two inputs to the adder 12 will be "one" and "zero" to generate at the output of the adder address corresponding to number one. On the rising edge of the second clock pulse, this value will be clocked into the shift register 12 and into memory 17 to generate address number "one" at the output of the memory 12. On the leading edge of the seventh clock pulse, the output of memory 18 will be all ones indicating the end of the address sequence (cycle). This causes the test signal 21 to rise to a logic "one" as a result of the M×N−1 test circuit 22. The trailing edge of this signal also resets the shift register 12 and memory 17 to generate an address of "zero". Additionally, the trailing edge of the test signal 20 shifts the one bit stored in the shift register 10 one bit position in essence to giving this a binary value of two. This begins cycle #2 during which a binary value of two will be added to the current address to generate the next address. During cycle #2, the operation is essentially identical to that described above except that now for each memory cycle, a binary value of 2 will be added to the digital number stored in the memory 12 to generate the corner turn address sequence in which each subsequent value differs from the preceding value by a binary two. When the current address has a value of "seven" the test signal will shift the one bit logic signal stored in shift register 10 one bit position and the cycle described above repeated to generate the addresses corresponding to cycle #3. After cycle #3, cycles one, two and three are repeated. A detailed examination of the address sequence reveals that it is necessary to couple the carry output of the most significant bit of the adder 14 to the carry input of this adder in order to generate the 6 to 1 address of cycle #2 and the 5 to 2 address of cycle #3. This feature is also present in other address sequences.

This completes the description of the operation of the circuit for generating corner turn address sequences. An examination of this sequence indicates that all that is required to generate other memory sequences for a memory matrix having a size which is an integral power of 2 is to change the test circuit 22 to test for the appropriate address, select the proper number of bits for the shift register 10 and couple these bits to the proper bit position of the adder 14.

Figure 3:
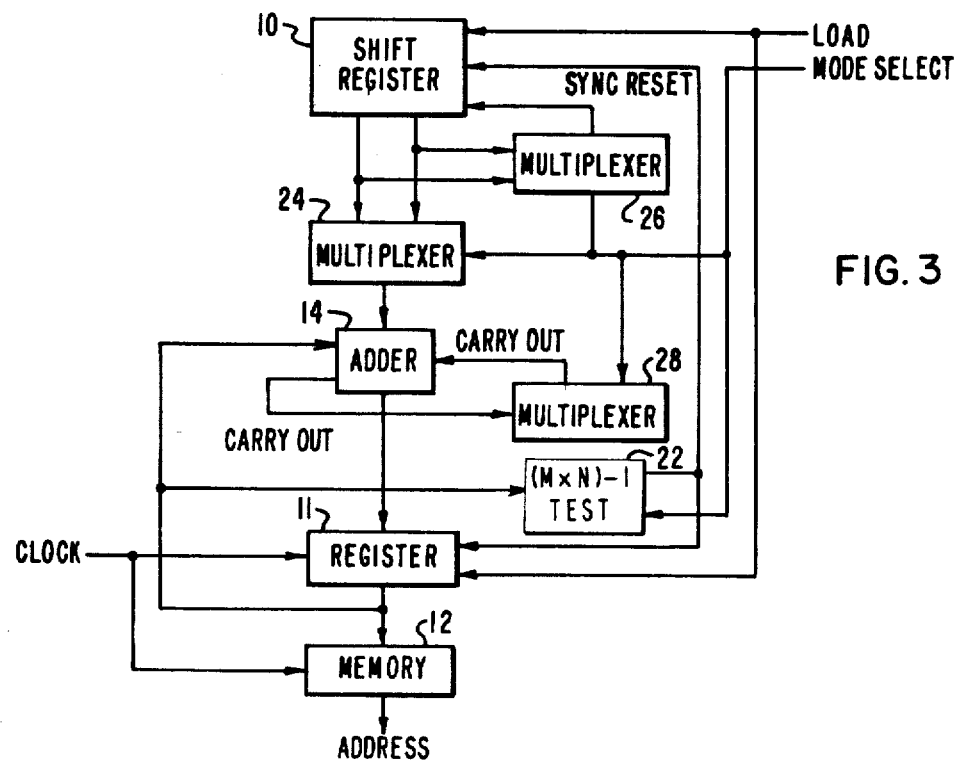
FIG. 3 is a modification of the circuit illustrated in FIG. 1 to include circuitry permitting the size of the memory matrix to be changed.

FIG. 3 is a modification of the system illustrated in FIG. 1 to permit the size of the memory matrix to be changed. The shift register 10, adder 14 and storage registers 12 as well as the test circuit 22 and the system illustrated in FIG. 3 perform identically to corresponding circuits previously described with reference to the circuit illustrated in FIG. 1. Therefore, no further description of these circuits is believed to be necessary. The address generator illustrated in FIG. 3 has been modified from the one illustrated in FIG. 1 by the inclusion of three multiplexers 24, 26 and 28. These multiplexers permit the size of the memory matrix to be changed. More specifically, the multiplexer 24 selects the input of the adder 14 to which the bits of shift register will be coupled and the number of bits in the shift register 10.

In general, the number of bits in the shift register 10 can be determined by the following formula:

$$\text{No. of bits} = \frac{m + n}{gcd(m, n)}$$

Terms previously defined.

Similarly, the input of the adder to which the bits of the shift register 10 will be coupled is determined by the dimension of the memory array. For example in the first sequence illustrated above, the bits of the shift register 10 were coupled to the adder 14 to increment the current address by "one" during cycle #1, by "two" during cycle #2 and by 4 during cycle #3. In the second illustration, the current address was incremented by "one" during cycle #1 and by "four" during cycle #2. In general, each desired memory matrix must be designed into the multiplexers, with the complexity of the multiplexers and the number of bits in the address being the factors which limit the size of matrix which can be addressed.

In the above description, the invention was described with respect to a small matrix. In fact, the matrix actually illustrated has limited usefulness due to its small size, however, it is believed the best method of illustrating the operation of the invention because it is practical to show all of the addresses generated for a larger but more useful matrix. With a larger matrix, for example, a matrix having 128 columns and 512 rows, it is not practical to show all of the intermediate address. It is believed to be desirable to show all of the intermediate addresses in order to illustrate the use of the carry output of the adder. In any case the examples discussed are typical of all corner turn memory sequences dimensioned in integral binary powers.

I claim:

1. Circuitry for generating an address sequence, each member of said address sequence specifying a storage location in a digital memory for storing data, said data being arranged as a data matrix having first and second dimensions designated as (M) columns and (N) rows, each element of said data matrix occupying at least one storage location in said memory with the product (M) (N) being an integral power of two, comprising in combination:

(a) adder means having at least first and second data input terminals and data output terminals;
   (b) first storage means comprising a shift register having data input and data output terminals for storing a first digital number, said first digital number comprising a member of said address sequence to produce at said data output terminals said first digital number said storage means further comprising means operable to shift said shift register one bit each time the output signal of said adder means is equal to $((M \times N) - 1)$;
   (c) second storage means for storing a second number to be added to said first digital number to generate a second member of said address sequence;
   (d) third storage means having data input and data output terminals for storing the current member of said address sequence to produce at said data output terminals of said third storage means said current member of said address sequence;
   (e) circuit means for
      (1) coupling said first digital number to said first data input terminals of said adder means,
      (2) coupling means for coupling said second number to said second data input terminals of said adder,
      (3) coupling means for coupling said data output terminals of said adder means to said input data terminals of said first storage means, and
   (f) clock signal means for sequentially storing the output of said adder means in said third storage means, thereby producing sequential members of said address sequence at the output terminal of said third storage means.

2. Circuitry in accordance with claim 1 wherein the carry output signal of the most significant bit of said adder means is coupled to the carry input port of the least significant bit of said adder means.

3. Circuitry in accordance with claim 2 further including a multiplexer for selectively coupling the bits of said shift register to said adder means.

4. Circuitry in accordance with claim 3 further including a second multiplexer selectively coupling the carry signal of said adder means to the carry input port of said adder means.

5. Circuitry in accordance with claim 3 further including circuitry responsive to the output of said adder means and to an externally supplied mode signal thereby permitting specific values for $((M \times N) - 1)$ to be selected.

* * * * *